Sept. 20, 1971 J. DYSON 3,606,548
MEASUREMENT OF DISPERSION OF LIGHT
Filed Oct. 10, 1968
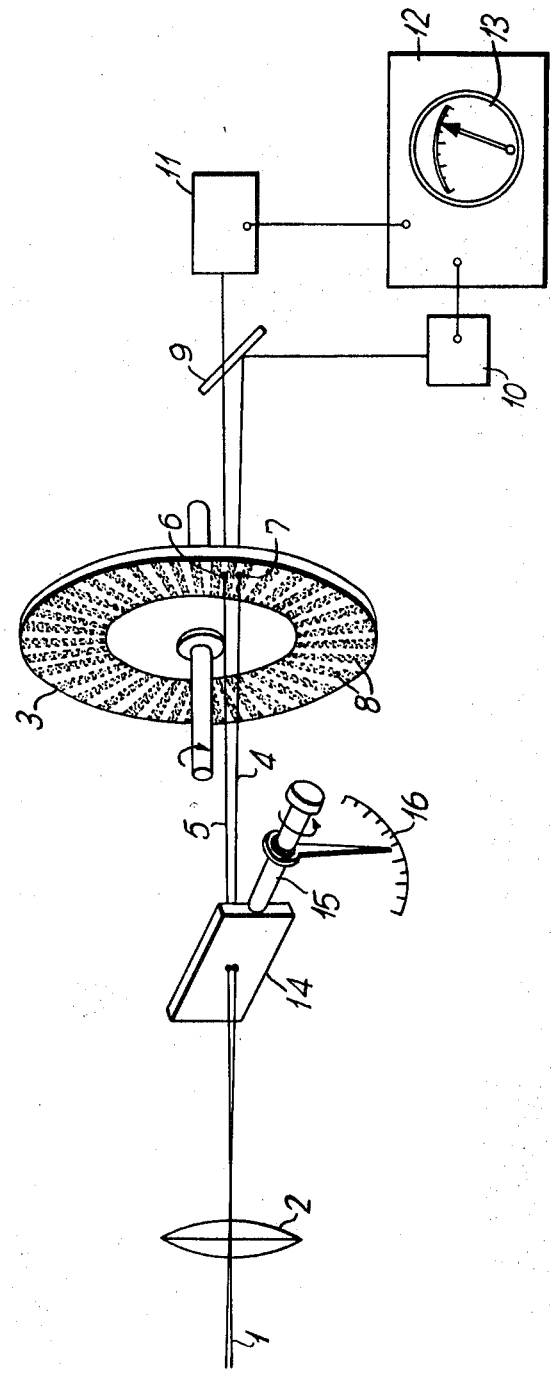

United States Patent Office 3,606,548
Patented Sept. 20, 1971

3,606,548
MEASUREMENT OF DISPERSION OF LIGHT
James Dyson, East Molesey, England, assignor to National Research Development Corporation, London, England
Filed Oct. 10, 1968, Ser. No. 766,591
Claims priority, application Great Britain, Oct. 16, 1967, 47,133/67
Int. Cl. G01n *21/46;* G01j *3/48*
U.S. Cl. 356—128                 10 Claims

ABSTRACT OF THE DISCLOSURE

An apparatus for measuring the dispersion of light during its passage through the atmosphere in which a ray of light is modulated by a rotating chopper. Light of differing wave-lengths in the ray is chopped at different instants due to the lateral displacement of images of the source of the ray formed by light of differing wavelengths resulting from dispersion of the light by the atmosphere. The phase difference of the modulations for two colours, which is related to the dispersion, is measured.

---

The invention relates to the measurement of the dispersion of light and in particular to the measurement of the dispersion of light when travelling over considerable distances through the atmosphere.

The measurement by optical means of the direction in which a small object, such as a light source, lies from an observer is subject to errors due to the lack of homogeneity of the atmosphere. Such a measurement, for example, may be made in surveying.

Inhomogeneities of the atmosphere may take, for example, the form of turbulence, or a more or less static gradient of density across the line of sight between the observer and the object. Turbulence, although annoying, does not give rise to any systematic errors because it moves the image of the source, or spoils its definition, in a random manner. It is easy to see if turbulence is present merely by watching the image for a short period of time. A quasi-static density gradient, however, will cause a shift in the position of the image which may remain substantially constant for an appreciable period of time. The presence of a quasi-static density gradient is not betrayed by rapid random movements of the image, indeed it may not be betrayed at all visually, and systematic errors of unpredictable magnitude or sign may be introduced into any measurements that are being made.

It is known that such an image shift is accompanied by dispersion, that is, the shift is different for light of differing wave-lengths, and that a relationship exists between the dispersion and the image shift. Thus, if the dispersion of, say, red and blue light contained in a ray of "white" light is measured, the image shift for a given wave-length may be found by multiplying the dispersion by an appropriate factor. A difficulty arises, however, because this factor is approximately equal to 100, and so, as the image shift may only amount to a few seconds of arc, the dispersion will be only a few hundredths of a second of arc and must, for the sake of accuracy, be measured to a small fraction of this amount.

It is an object of the present invention to provide apparatus that is capable of measuring small dispersions. According to the present invention there is provided apparatus for measuring dispersion light of differing wavelengths in a ray, comprising means for modulating the ray by means of a cyclically moving element, whereby the phases of the modulation for light of two different wave-lengths in the ray will differ by an amount dependent upon the magnitude of the dispersion, means responsive to the modulated ray for developing two signals respectively representing the modulation for light of said differing wave-lengths, and means for comparing the phase of the two signals.

Preferably, the means for modulating the ray comprises a disc having alternate transparent and opaque sections which is arranged to rotate about an axis substantially parallel to the direction of the ray of light which is imaged upon the disc, the means responsive to the modulated ray comprises a dichroic beam splitter, and two photo-electric devices upon which the light of differing wave-lengths respectively falls and the output signals of which are fed to a phase sensitive detector.

The apparatus may also include means for causing a further dispersion of the light in a sense opposite to that of the said dispersion, and means for indicating the amount of the further dispersion.

The invention will be described, by way of example, with reference to the accompanying drawing, which shows diagrammatically an embodiment of the invention in the form of a theodolite or alignment telescope.

Referring to the drawing, a ray 1 of white light from a distant source, not shown, falls upon an objective 2 which images the ray 1 upon a disc 3, to be described more fully later. During the passage of the ray 1 from the source to the disc 3, the red and blue components 4 and 5 of the ray 1 will be refracted to different extents by the atmosphere, and the objective 2 will form two images 6 and 7 upon the disc 3 that are slightly displaced from each other.

The disc 3 is transparent but has a number of opaque radial lines 9 upon it, typically there may be 1000 lines at a spacing of about 0.010". The light which penetrates the disc 3 falls upon a dichroic beam splitter 9 of a known type, which reflects red light but transmits blue light. The red light 4 is reflected and enters a photomultiplier 10 whereas the blue light 5 which is transmitted enters another photo-multiplier 11. The disc 3 is caused to rotate by a motor, not shown, so that the light is chopped by the passage of the opaque parts of the disc 3 through the path of the ray 1. The frequency of rotation is chosen to be such that the modulation frequency is a few kc./s. The photomultipliers 10 and 11 each develop a signal having this frequency, the waveform of which can be made into a sine wave by known methods. The two signals however will have a phase difference because the slightly differing positions of the images 6 and 7 cause the red and blue components 4 and 5 of the ray 1 to be chopped by the radial lines 8 at different instants. The signals from the multipliers 10 and 11 are fed to a phasemeter 12, of an integrating type having a time constant of a few seconds. The phasemeter 12 is equipped with a centre-zero meter 13 which shows the magnitude and sign of this phase difference.

A glass plate 14, of say 1 mm. thickness, is mounted in such a manner that it intercepts the dispersed ray 1 and can be rotated about an axis 15 at right angles to the ray 1; its tilt being indicated upon a graduated scale 16. When the glass plate 14 is tilted, it shifts ray 1 sideways by an amount dependent upon the optical path length of the ray 1 in the glass plate 14. This shift will also exhibit dispersion, which can, by suitable adjustment of the tilt, be made just to cancel that due to the atmosphere, at which point the meter 13 will read zero. From the reading on the scale 16 and the known optical constants of the glass plate 14, the amount of this dispersion, and hence that due to the atmosphere, can be calculated. If the material of the glass plate 14 is correctly chosen so that the ratio of the image shift to the dispersion of that shift is the same as the corresponding ratio for air, then, when the phase-shift is reduced to zero, the two images 6 and 7 will coincide, not only with each other, but also with the position the image would have if the atmosphere were not present.

This can be achieved to a good approximation by using a light flint glass such as that known as Chance LF575426.

A refinement of the apparatus is to arrange for the adjustment of the glass plate 14 to be made automatically. This can be done by means of a servo-mechanism of known type connected to the phase-sensitive detector 12 and arranged to rotate the glass-plate 14 about the axis 15 until the phase-shift is reduced to zero.

It is to be noted that, although the objective 2 is shown for simplicity as a lens, in practice a reflecting system such as a Cassegrainian telescope would be used. This is because even a small error in the centering of a lens system would give enough lateral colour in the image formed by that system to disturb the measurement.

I claim:

1. Apparatus for measuring dispersion of light having differing wavelengths combined in a light ray, said apparatus comprising:
   a cyclically movable element for modulating said ray of light by moving thereacross thereby modulating said light of differing wavelengths combined in said ray at a common frequency but at different phase angles which will differ by an amount dependent on the magnitude of the dispersion of the light in said ray,
   means for splitting said modulated ray of light into at least two portions each having different wavelengths,
   means responsive to each of said split portions for developing two signals respectively representing the modulation content of each of said two portions, and
   means for comparing the phases of said two signals thereby determining the magnitude of said dispersion.

2. Apparatus as in claim 1 wherein said means for splitting the modualted ray of light comprise;
   a dichroic beam splitter, and wherein said means for developing two signals comprises;
   a first photosensitive device sensitive to light of one of said portions, and
   a second photosensitive device sensitive to light of the other said portion.

3. Apparatus as in claim 2 further including:
   means for causing an additional variable dispersion of said light ray in a sense opposite to said first-mentioned dispersion, and
   means for indicating the amount of said further dispersion.

4. Apparatus as in claim 3 wherein said means for causing an additional dispersion comprises:
   a block of light flint glass, said block being rotatably mounted about an axis at right angles to said light ray, and wherein
   said means for indicating the amount of said further dispersion comprises means for indicating the orientation of said block of glass.

5. Apparatus for measuring dispersion of light having differing wavelengths combined in a light ray, said apparatus comprising;
   a disc having alternate transparent and opaque sections,
   means for rotating said disc about an axis substantially parallel to said light ray thereby causing said alternate transparent and opaque sections to sequentially intercept said ray thus modulating said light of differing wavelengths and producing different phase angles of modulation in said differing wavelengths of light which phase angles will differ by an amount dependent upon the magnitude of said dispersion,
   a dichroic beam splitter for splitting the resulting modulated ray of light into at least two portions having different wavelengths,
   means responsive to each of said split portions for developing two signals respectively representing the modulation content of each of the said two portions, and
   means for comparing the phases of said two signals thereby obtaining an indication of said dispersion.

6. Apparatus as in claim 5, including:
   means for causing an additional variable dispersion of said light ray in a sense opposite to that of said first-mentioned dispersion, comprising a block of light flint glass with said block being rotatably mounted about an axis at right angles to said ray, and
   means for indicating the amount of said additional dispersion comprising means for indicating the orientation of said block of glass.

7. Apparatus as in claim 6 and further including means for imaging said ray upon said disc.

8. Apparatus as claimed in claim 7 in which the said means for imaging comprises a Cassegrainian telescope.

9. Apparatus for measuring dispersion of light having differing wavelengths combined in a light ray, said apparatus comprising:
   a disc having alternate transparent and opaque sections,
   means for imaging said ray onto said disc,
   means for rotating said disc about an axis substantially parallel to said light ray thereby causing said alternate transparent and opaque sections to sequentially intercept said ray and thus modulate the said ray causing the phases of modulation of said light having different wavelengths to differ by an amount dependent upon the magnitude of said dispersion,
   a dichroic beam splitter for splitting said modulated ray of light into at least two portions of different wavelengths,
   means responsive to each of said split portions for developing two signals respectively representing the modulation content of each of the said two portions,
   means for comparing the phases of said two signals,
   means for causing a further variable dispersion of said modulated ray in a sense opposite to said dispersion, and
   means for indicating the amount of said further dispersion.

10. Apparatus according to claim 9 wherein said means for causing said further dispersion comprises:
    a block of light flint glass, said block being rotatably mounted about an axis at right angles to said ray, and wherein said
    means for indicating the amount of said further dispersion comprises means for indicating the orientation of said block of glass.

References Cited

UNITED STATES PATENTS

| | | | |
|---|---|---|---|
| 2,444,560 | 6/1948 | Feldt et al. | 356—83 |
| 3,291,991 | 12/1966 | Welti | 250—233X |
| 2,861,172 | 11/1958 | Mandler | 356—100 |

OTHER REFERENCES

"Dispersion," Fundamentals of Optics; Larkin and White; pp. 464+.

RONALD L. WIBERT, Primary Examiner

C. CLARK, Assistant Examiner

U.S. Cl. X.R.

316—188